Sept. 5, 1933.   D. H. KILLEFFER   1,925,537
REFRIGERATING APPARATUS AND METHOD
Filed April 26, 1930   2 Sheets-Sheet 2
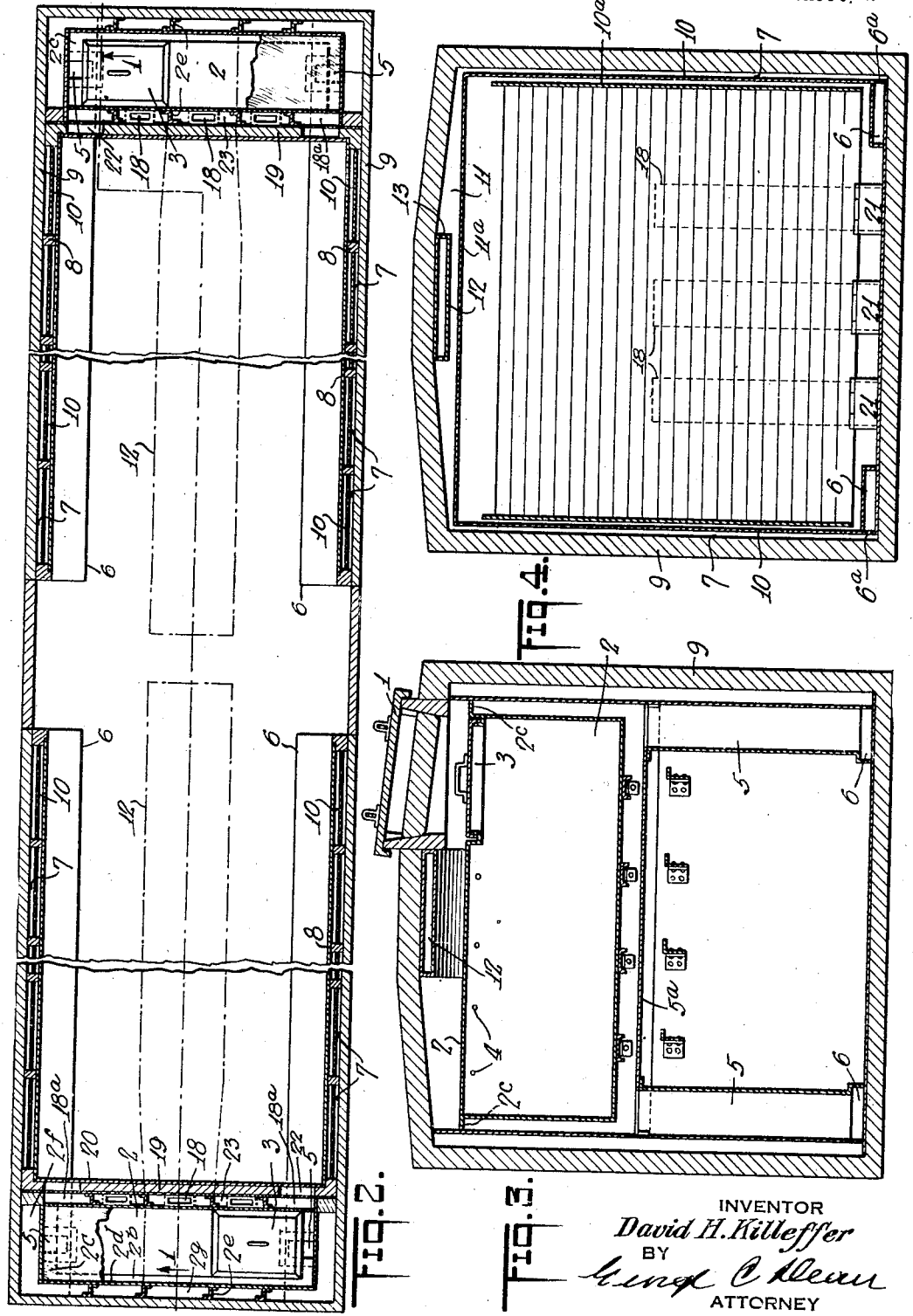
INVENTOR
David H. Killeffer
BY
ATTORNEY Patented Sept. 5, 1933

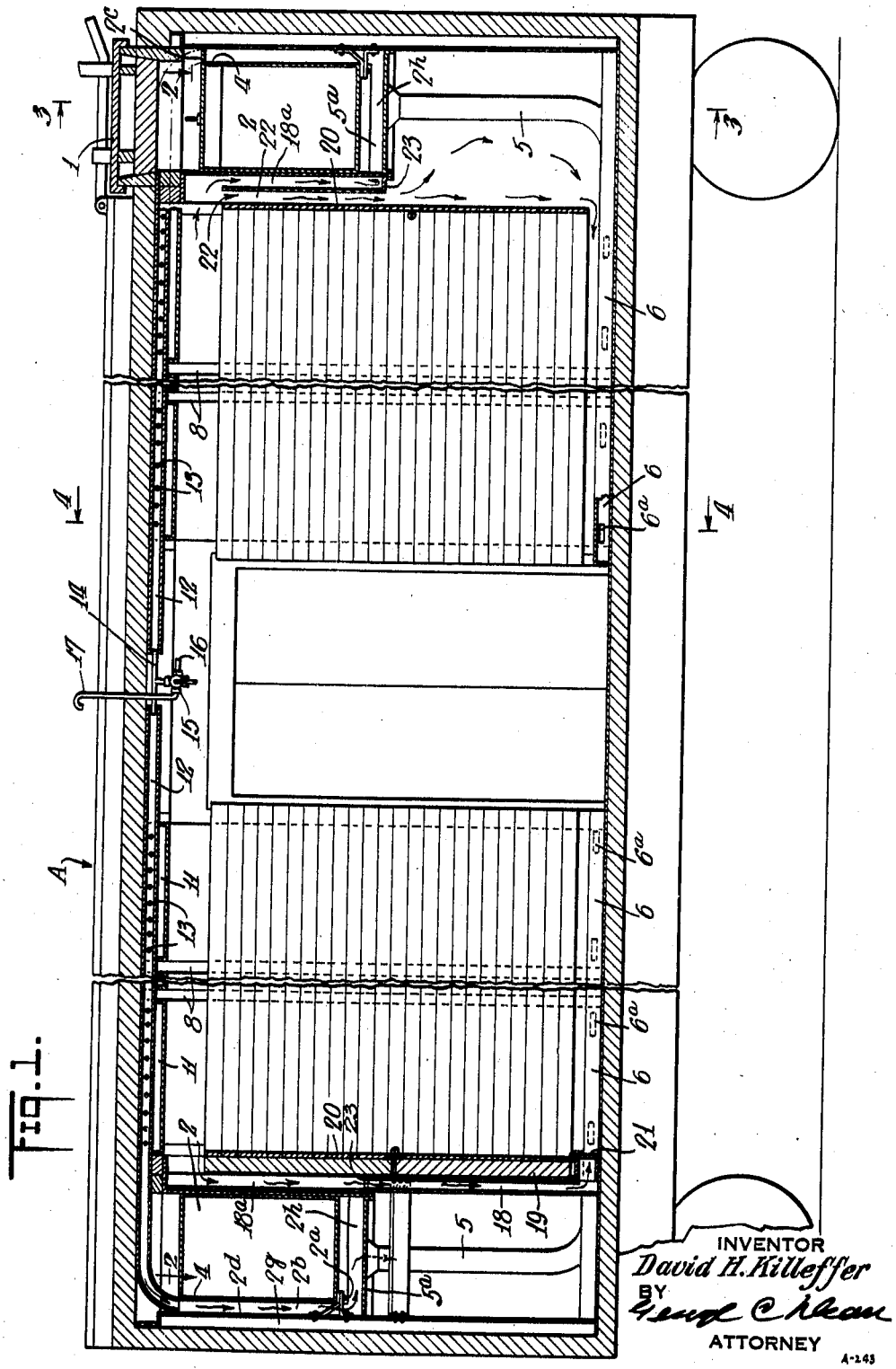

1,925,537

UNITED STATES PATENT OFFICE 1,925,537

REFRIGERATING APPARATUS AND METHOD

David H. Killeffer, Yonkers, N. Y., assignor to Dryice Equipment Corporation, New York, N. Y., a corporation of Delaware Application April 26, 1930. Serial No. 447,470

17 Claims. (Cl. 62—91.5)

My present invention relates to refrigerators of a type adapted to employ very intense refrigerants, particularly solid carbon dioxide, and to methods of and apparatus for solving special problems connected with the employment of solid carbon dioxide for commercial refrigerating purposes. The invention is particularly adapted for and is shown as embodied in a refrigerator car, but it is equally applicable to refrigerator trucks, cold storage rooms, household refrigerators or the like, particularly where the intense refrigerant and the very cold gas therefrom are utilized to maintain closely regulated temperatures, usually far above the evaporation point of the refrigerant and usually near and above the freezing point of water.

Among the unique factors involved in the use of solid carbon dioxide as a refrigerant for such purposes, are the following:

As is well known, the solid carbon dioxide sublimates directly to a gas, without any intermediate liquid state, at a temperature of approximately 110° F. below zero, although the temperature may vary within wide limits above and below said temperature, according to the pressure, and the percentage of air in the atmosphere that bathes the solid carbon dioxide.

The refrigerant action is two-fold, that is to say, the local heat absorbed by change of the carbon dioxide from solid to gaseous state is one factor, the other factor being the resulting gas, which absorbs a substantial amount of heat while warming up to normal temperatures.

The carbon dioxide gas is remarkably superior to air as a heat insulator even where the conditions of temperature and moisture content are the same and the freshly evolved gas is phenomenally superior because it is substantially free from moisture content.

An important factor in controlling the flow of the freshly sublimated gas for efficient functioning as a heat insulator as well as a refrigerant medium, is that the gas is very heavy, because it is cold, and also because of its great molecular weight, which is greater than that of air even when both are at the same temperature. Hence, whenever the fresh cold gas is free to do so, it will flow downward, displacing upward, air, air and gas mixture and even pure carbon dioxide gas of higher temperature.

Consequently, where the fresh cold gas is free to flow downward in the atmosphere of the refrigerated space, as in Fig. 15 of Slate Patent No. 1,511,306, there is a marked tendency to low temperature in the lower level parts of the space as compared with the higher levels. Moreover, as the gas warms up, there is much diffusion and co-mingling of the air and its moisture content, with the gas, thereby impairing the remarkable heat insulating efficiency of the latter.

Moreover, it is broadly true that if there are any low level openings or leaks, either in a refrigerated space or in any other container in which it is held, the cold gas will drain downward by gravity through the lower openings or leaks. If said lower openings or leaks are large enough, the downflowing gas will be replaced by air or warmer gas from the exterior, and even if the lower openings or leaks are very small, there will be a suction effect which will draw in air, in case there are any high level openings or leaks.

By reason of the above characteristics, it has already been proposed to locate the solid carbon dioxide refrigerant at the high level of the refrigerated chamber, so that the primary or local heat absorption will occur at a high level where the temperature is likely to be highest; also to confine the flow of the cold gas that is sublimated from the solid to ducts, which may be the interspace between double walls of the refrigerator, so that the freshly sublimated cold gas will flow serially through separate down-flow and up-flow ducts or interspaces that are in U-relation, so that the upflow will be in counterbalancing relation to the downflow, and the resulting thermo-circulation tendency will be determined by the difference in temperatures and resulting densities of the fresh cold gas in the downflow duct as against the partly warmed gas in the upflow duct. Even in such duct systems, there is the above tendency to much higher temperatures in the high level parts of the U-related ducts.

The object of my present invention is to utilize the above factors and characteristics of the gas in various novel ways, which are each separately important but all of which cooperate to produce a novel refrigerating system.

Among these may be noted the following:

The supply of solid carbon dioxide is located in a high level container from which flow of the gas is confined to ducts or interspaces serially connected in U-relation, preferably a completely closed circuit, one leg of which leads downward to and through horizontally extending ducts at a low level of the refrigerated space, thence upward, preferably through parallel-connected ducts, preferably in the walls of the refrigerator, thence into a high level return conduit which discharges the gas in heat exchange relation with the container for the solid carbon dioxide but preferably not in contact with said solid. This return gas which has absorbed most heat from the refrigerated space, imparts its heat to said container, thereby causing additional gas evolution, the amount of the gas thus evolved naturally and automatically varying with the temperature of the return gas.

The horizontally extending ducts serve as headers discharging the gas into the upflow ducts through a plurality of suitably distributed openings of relatively small cross-section whereby a slight back pressure is maintained on the gas to insure that its distribution will be proportional to the equal areas of the outlets rather than according to their distance from the source. The upflow ducts are shown as discharging into a high level horizontal portion of the gas path which is preferably arranged to bring the returning gas in heat exchange relation with all or a large part of the upper surface or ceiling of the refrigerated space. Preferably, the space above the ceiling is of considerably volumetric capacity and the gas therefrom is discharged through another series of restricted inlets into a return conduit which delivers the gas in heat absorbing relation to the container. These two sets of restrictions maintain a slight but important back pressure on the gas first from the source into the upflow leg and second from the high level part into the return conduit.

The above described closed circuit insures purity and dryness of the circulating gas, the gas evolution being proportional to the temperature of the returning gas and not varied in accordance with a variable admixture of air. Moreover, the excess gas can be discharged outside of the refrigerator under conditions where such space is to be entered by users or workmen, or inside the refrigerator when it is to be closed for long periods. Moreover, a certain amount of pressure may be maintained on the circulating system and on the solid carbon dioxide, thus insuring any leaks will be outward, thereby preventing possible inleak of air.

The dividing of the upflow portion of the circulation into a plurality of parallel conduits connected with upper and lower headers, has the advantage that each up conduit will more freely draw cold gas from the header, in proportion to its temperature, independently of the temperatures that may exist in the other parallel upflow conduits.

The important feature of the circulation is that the returning warmed, but pure gas, surrounds the solid carbon dioxide container and affords most effective insulation thereof from exterior heat.

Consequently, in normal operation, distribution of the refrigerant values is mainly by the gas flowing through the above described closed circuit; and the warmer the refrigerated space, the faster the gas circulates. The above described system is combined with another circulating system, whereby the atmosphere in the refrigerated space may be directly applied as supplemental medium for distribution of the refrigerant values. To this end, the main body of atmosphere in the refrigerated space is cut off from the solid carbon dioxide container but may be brought into heat exchange relation therewith by downflow interspaces or conduits which extend into direct conductive heat transfer relation with the solid carbon dioxide. They are accessible to air from the upper part of the refrigerated space and extend to the lower part thereof. The flow or non-flow of said atmosphere through said conduits is controlled by suitable gates which may be operated by hand or thermostatically, as may be desired. These gates may be at the bottom of the conduits since such location will cause the conduits to be normally filled with very cold air, which will immediately flow downward and draw in warmer air through the top, whenever the gates are opened.

With this double system of circulation, it will be understood that the heat absorbing area and conductivity of the gas circuit and its relation to the solid carbon dioxide container, will be coordinated and designed so as to maintain a desired range of relatively high temperature refrigeration in the refrigerated space, by reason of the automatic increase and decrease of rapidity of the gas circulation, in accordance with the temperature of the upflow part of the gas; while the atmospheric circulation through the other conduits may be adjusted so as to give a predetermined lower temperature range, and, what is more important, may be utilized as an emergency factor, to keep down the temperature whenever the normal, self-governing range of the gas circuit is exceeded, as where a refrigerator is subjected to abnormally hot weather; or where the supply of solid carbon dioxide gets low in one or more of the bunkers.

The above and other features of my invention may be more fully understood from the following detailed description in connection with the accompanying drawings showing an illustrative embodiment thereof, in which Fig. 1 is a vertical longitudinal sectional view taken on the broken line 1—1, Fig. 2, showing the invention as applied to a conventionally indicated refrigerator car.

Fig. 2 is a horizontal section of Fig. 1, taken on the line 2—2;

Fig. 3 is a section taken on line 3—3 of Fig. 1 and shows the solid carbon dioxide bunker and that section of the duct system which is in the ends of the car.

Fig. 4 is a vertical section taken on line 4—4 of Fig. 1 and shows the relative position of the various ducts, between the car side and roof supporting beams.

Referring to Fig. 1, the letter A generally indicates a refrigerator car of any conventional type which has the usual hatchways, 1, for the introduction of the refrigerant. Within the car and preferably at each end are the solid carbon dioxide containers 2, conveniently placed under the hatchways, so that, their lids 3 are easily removed for charging with the refrigerant. These containers or "bunkers" will be constructed in accordance with the size of the car and other controlling conditions. I have shown them as located at a high level, extending across almost the entire breadth of the car and being less than half of its height.

The refrigerant containers 2 are supported on brackets 2a so that there are downflow spaces or ducts 2b, 2c, at the rear and on both ends, to allow for free downflow of the carbon dioxide gas, but said spaces are closed at the top by flange-like extensions of the top of the bunkers, as indicated at 2c, Figs. 1, 2 and 3. In the rear, and preferably at the top are the holes 4 to allow for the escape of carbon dioxide gas from within the bunker and the holes are preferably of such small flow section as to maintain enough pressure within the bunker to prevent inbreathing and ensure a continuous outflow of carbon dioxide gas for circulation in the ducts.

The downflow spaces 2b, 2c at the rear and ends of each bunker discharge into space 2h which is closed by bottom member 5a from which lead ducts 5, preferably one duct 5 on each side against the side walls of the car, so that there are two downflow legs of the circulation for each end of the refrigerated space. It will be noted that this downflow portion and also the bunkers 2, located therein, are effectively insulated by the casing 2d which is spaced from the outer walls of the bunker space by angle irons 2e. The spaces 2f and 2g may contain gas or other insulating material, such as cork or kapok.

Each downflow duct 5 leads down to the floor and serially connects with a low level duct 6 of relatively small heat absorbing area and small flow section. How small these are as compared with the total flow area will be evident from inspection of Figs. 2 and 4.

The low level ducts 6 serve as headers for distribution of the gas through openings 6a, discharging into a plurality of separate upflow ducts 7 which substantially cover the side wall area of the car and are defined by vertical spacers 8, the outer wall 9, and the metal sheathing 10 which is spaced slightly away from the outer wall 9.

These upflow ducts 7 connect at their upper ends and serially discharge into transverse spaces or ducts 11 of which lower surfaces 11a constitute most of the ceiling area of the refrigerated space. These passages 11 across the top of the car are of relatively great flow section and volumetric capacity to permit slow flow and afford relatively long time for heat from the refrigerated space to be transferred to the gas, through the conducting walls 11a. Connecting each set of transverse spaces or passages 11 is a longitudinal header provided with intake openings 13 through which the gases flow and are discharged serially into the upper part of the down leg of the circulation previously described. As before explained, the warmer the refrigerated space, the warmer this return gas will be and the more it will heat the bunker, and the more copious will be the evolution of refrigerating gas that circulates through the system. Thus the system will be automatically self regulating for keeping temperature variations in the refrigerated space, within a relatively narrow range.

It is preferred to place two complete units, one in each end of the car, each comprising one bunker and the circulating system. In the case of a refrigerator car, the circulating system preferably extends only to the center doors through which the car is loaded and unloaded. The systems may be entirely independent, but obviously they can be connected to operate serially or in parallel either permanently or temporarily so that if one system begins to fail, either from overheat in the refrigerated space, or from exhaustion from the solid carbon dioxide in the bunkers, one system may draw upon the other. As shown in the drawings, the return conduits 12 are shown as connected by pipe 14 serving to equalize pressures in the systems and to thus permit one to control the other to a limited extent. Obviously, however, the lower headers 6 may be similarly connected if desired.

As shown in the drawings, the common pipe connection 14 is utilized as a common discharge for the excess gas, the pipes 14 connecting with a three-way valve 15 whereby the carbon dioxide gas can be vented to the refrigerator space through the opening 16, as when the car is to be closed for long periods, or to the atmosphere through the pipe 17 as when it is desired for any reason to keep the carbon dioxide gas out of the refrigerated space.

The refrigerated space preferably has sheathing 10a to physically protect the conduits from the cargo and prevent direct heat transfer between the cargo and the conduits.

Up to this point the operation of the system is as follows: Carbon dioxide gas sublimated within the bunker 2 will overflow through the outlets or vents 4, flowing down back of the bunker through ducts 2b, and dividing will flow down through ducts 5. Each duct 5 serially connects with its distributing duct or header 6, whence the gas can flow in parallel through openings 6a into the parallel upflow passages 7 constituting the counterbalancing up-leg of the circulation. As the gas warms up, it will be over-balanced by the heavy cold gas in the downflow leg and will flow into ceiling spaces 11. The warmest part of the gas in this space will escape through openings 13 into the return conduit 12 which completes the circuit.

The aggregate flow section of the openings 6a is substantially less than that of header 6 to maintain a slight drop in pressure between the distributing conduit 6 and the upflow conduit 7 and, said openings 6a being of the same size and flow resistance, the gas flow will divide according to the heat and resulting weight of the gases in said upflow conduit, without any tendency for the openings 6a that are nearest to the source to rob those that are more distant. Similarly, the opening 13 into the return conduit 12 are of aggregate flow section less than that of the upflow conduit and also less than that of the return duct 12 and being of equal size will tend to pass equal quantities of gas regardless of their respective distances from the outlet end of the discharge conduit. In this way, there is no tendency to short circuit flow from header 6 through the nearest upflow conduit 7 and from upflow conduit 7 into the nearest opening 13 into the return conduit. In practice, the two sets of openings, 6a and 13, may be of substantially the same size and yet produce the above desired result, because the gas flowing through holes 13 will be much warmer and its volume therefore greater than the same gas when it flowed through the lower openings 6a.

As before explained, this system operates to absorb heat with relative uniformity throughout the bottom, sides and top of the refrigerated space and this system is self regulating for a narrow range of temperatures, under widely varying external temperatures.

However, it may be desirable to shift the normal temperature range of refrigeration; or abnormal conditions of external temperature may be encountered that cannot be foretold, as in the case of cars, particularly fruit cars travelling from the warmer climates of one section of the country to the much colder ones in a different section. For such purposes, my invention contemplates a novel, supplemental arrangement for adjusting or controlling the evolution and distribution of the refrigerant values, the supplemental distributing medium being the atmosphere within the refrigerated space.

For this purpose, I provide the ducts or conduits 18 interposed between the refrigerated space and the surface of the refrigerant container 2, which is presented toward the interior. This interspace is open for access of atmosphere from a point near the top of the car and extends down to the bottom of container 2. From this point down to the floor, there are separate ducts 18. This flow path through 18a, 18 from the top of the refrigerated space to the bottom thereof is controlled by suitable valves or gates 21, which are located, preferably in the ducts 18, preferably at the lower end thereof. They may be partly or wholly opened or closed, either manually or automatically, as by means of a thermostat.

When valve or valves 21, are closed, the air in the space 18a and in the ducts 18 will become very cold and will serve as effective heat insulation for the bunkers; but when any valve 21 is partly or wholly opened, this cold heavy air will quickly drain out, drawing in warm air from the upper portion of the car through the upper end of 18a and this air will flow down the side of the very cold carbon dioxide container, imparting heat thereto and being itself chilled thereby, and will gravitate into the refrigerator chamber, displacing warmer air upward, thus establishing a convection circuit of air, the upflow leg of which is the refrigerated space, and which is entirely independent of the gas circulating system.

The space below the bunker is, naturally, very cold due to its proximity to the refrigerant and the cold supplied by the carbon dioxide gas flowing through the ducts 5. In order to keep this space from becoming a pocket of stagnant, intensely cold atmosphere, I may provide for a supplemental circulation therethrough, of air from the refrigerated space, as by passages 22 shown at the right in Fig. 1. These may be accommodated by omitting insulation at each end of bulkhead 20 from a point near the top of the car. This will permit a desired amount of constant leakage of air entering at the top part of the bulkhead flowing down through the spaces 22 into the space under the bunker and back under the bulkhead into the refrigerator chamber. This flow is sufficient to prevent the space under the bunker from becoming too intensely cold, but not enough to prevent it from serving its function as a cold insulating jacket for the down-leg of the circulation. This relatively feeble circulation from the refrigerated space is, of course, in parallel with the powerful, effective circulation established through the ducts 18 when valves 21 are open, and it may be designed or adjusted as a supplement thereto.

It will be evident from the drawings, that the passages in the sides and at the top of the car are formed by the supporting elements which are necessary in constructing the ordinary refrigerator car. Were it not for the space occupied by these various supporting elements, my system would completely surround walls and ceiling of the refrigerator chamber with the cold carbon dioxide gas, but none of the gas would be permitted to escape into the interior of the refrigerator chamber, unless desired.

This system provides a localized refrigerant source, the metal container for the solid carbon dioxide; a jacket of cold carbon dioxide gas of phenomenal insulating value, substantially surrounding the space cooled; and an additional means to cause and control independent, circuit flow of atmosphere from the refrigerated space, downward in heat exchange relation with the refrigerant container, returning upward through said space.

I claim:—

1. A refrigerator comprising an outer casing and a refrigerating system including a receptacle for solid carbon dioxide and a closed circuit connected thereto serially including a downflow conduit, a low level lateral flow conduit, an upflow conduit and a high level return conduit discharging in heat exchange relation with the solid carbon dioxide, the entire downflow portion of the circuit, including the solid carbon dioxide receptacle, being protected from directly absorbing heat from the refrigerated space.

2. A refrigerator comprising an outer casing and a refrigerating system including a receptacle for solid carbon dioxide and a closed circuit connected thereto serially including a downflow conduit, a low level conduit having a restricted outlet, an upflow conduit having a restricted outlet and a high level return conduit discharging in heat exchange relation with the solid carbon dioxide, but not in contact therewith.

3. A refrigerator comprising an outer casing and a refrigerating system including a receptacle for solid carbon dioxide and a closed circuit connected thereto serially including a downflow conduit, a low level distributing conduit having a plurality of restricted openings each discharging into an upflow conduit and said upflow conduits discharging into a high level return conduit which discharges in heat exchange relation with the solid carbon dioxide but not in contact therewith, the discharge into said return conduit being through a series of restricted openings, the flow sections of said restricted openings being such as to maintain desired back pressure on the conduits discharging therethrough.

4. A refrigerator comprising an outer casing and a refrigerating system including a receptacle for solid carbon dioxide and a closed circuit connected thereto serially including a downflow conduit, a low level lateral flow conduit, an upflow conduit and a high level return conduit discharging in heat exchange relation with the solid carbon dioxide but not in contact therewith, the high level return portion being arranged to constitute a roof or ceiling for the refrigerated space.

5. A refrigerator and a refrigerating system therein, including a receptacle for solid carbon dioxide and a closed circuit for gas therefrom, serially including a downflow conduit, a low level lateral flow conduit, a plurality of parallel upflow conduits, a high level chamber into which said upflow conduits discharge and a return conduit extending within said chamber and discharging in heat exchange relation with the solid carbon dioxide, the lateral flow portion of the conduit having separate restricted outlets into the respective upflow conduits and said return conduit having a series of restricted inlets from said high level chamber; in combination with a supplemental circulating system whereby the atmosphere in the refrigerated space may be caused to circulate in heat exchange relation with the solid carbon dioxide and means for controlling said supplemental circulation.

6. A refrigerator comprising an outer casing and a refrigerating system including solid carbon dioxide and a closed circuit for gas therefrom serially including a downflow conduit, a low level lateral flow conduit, an upflow conduit and a high level return conduit discharging in heat exchange relation with the solid carbon dioxide, a substantial portion of the downflow conduit being protected from absorbing heat from the refrigerated space; in combination with a supplemental circulating system whereby the atmosphere in the refrigerated space may be caused to circulate in direct heat exchange relation with the downflow portion containing the solid carbon dioxide and means for controlling said supplemental circulation.

7. A refrigerator comprising an outer casing and a refrigerating system including a closed circuit serially including a downflow conduit enclosing solid carbon dioxide, a low level lateral flow conduit, an upflow conduit and a high level return conduit discharging in heat exchange relation with solid carbon dioxide, the entire downflow portion of the circuit, including the solid carbon dioxide receptacle, being protected from directly absorbing heat from the refrigerated space; in combination with a supplemental circulating system whereby the atmosphere in the refrigerated space may be caused to circulate in direct heat exchange relation with the downflow portion containing the solid carbon dioxide and means for controlling said supplemental circulation.

8. A refrigerator comprising an outer casing and a refrigerating system including a closed circuit serially including a downflow conduit enclosing solid carbon dioxide, a low level conduit, an upflow conduit and a high level return conduit discharging in heat exchange relation with the solid carbon dioxide, the lateral flow portion of the conduit having much less heat absorbing area relative to its cross-section than has the upflow portion; in combination with a supplemental circulating system whereby the atmosphere in the refrigerated space may be caused to circulate in direct heat exchange relation with the downflow portion containing the solid carbon dioxide and means for controlling said supplemental circulation.

9. A refrigerator comprising an outer casing and a refrigerating system including a receptacle for solid carbon dioxide and a closed circuit connected thereto serially including a downflow conduit, a low level lateral flow conduit, an upflow conduit and a high level return conduit discharging in heat exchange relation with the solid carbon dioxide, the lateral flow portion of the conduit having much less heat absorbing area relative to its cross-section than has the upflow portion, and the upflow portion having much more heat absorbing area relative to its cross-section than has the lateral flow portion; in combination with a supplemental circulating system whereby the atmosphere in the refrigerated space may be caused to circulate in direct heat exchange relation with the downflow portion containing the solid carbon dioxide and means for controlling said supplemental circulation.

10. A refrigerator comprising an outer casing and a refrigerating system including a receptacle for solid carbon dioxide and a closed circuit connected thereto serially including a downflow conduit, a low level lateral flow conduit, an upflow conduit and a high level return conduit discharging in heat exchange relation with the solid carbon dioxide, the high level portion being of much greater volumetric capacity than the other portions; in combination with a supplemental circulating system whereby the atmosphere in the refrigerated space may be caused to circulate in direct heat exchange relation with the downflow portion containing the solid carbon dioxide and means for controlling said supplemental circulation.

11. The method of controlling distribution of refrigerant effects of solid carbon dioxide, which includes locating the solid carbon dioxide within and protected by a downflow conduit and distributing the refrigerant values of the gas by circulating the latter through a closed conduit and returning it so that it again comes into heat exchange relation with the solid carbon dioxide but not in contact therewith, equalizing temperatures within the refrigerated space by exposing a relatively small area of the gas flow in heat exchange relation with the lower part of the refrigerated space and a much greater area in lateral heat exchange relation with the higher portions of said space.

12. The method of controlling distribution of refrigerant effects of solid carbon dioxide, which includes locating the solid carbon dioxide within and protected by a downflow conduit and distributing the refrigerant values of the gas by circulating the latter through a closed conduit, thereby making the rate of sublimation of gas from the solid dependent on the temperature of the returning gas, equalizing temperatures within the refrigerated space by exposing a relatively small area of the gas flow in heat exchange relation with the lower part of the refrigerated space and a much greater area in lateral heat exchange relation with the higher portions of said space; and varying or adjusting the normal rate of sublimation of gas by circulating atmosphere from the refrigerated space in direct heat exchange relation with the protected solid carbon dioxide.

13. The method of controlling distribution of refrigerant effects of solid carbon dioxide, which includes locating the solid carbon dioxide within and protected by a downflow conduit and distributing the refrigerant values of the gas by circulating the latter through a closed conduit, equalizing temperatures within the refrigerated space by exposing a relatively small area of the gas flow in heat exchange relation with the lower part of the refrigerated space and a much greater area in lateral heat exchange relation with the higher portions of said space; and varying or adjusting the normal rate of sublimation of gas by circulating atmosphere from the refrigerated space in direct heat exchange relation with the protected solid carbon dioxide.

14. The method of controlling distribution of refrigerant effects of solid carbon dioxide, which includes locating the solid carbon dioxide within and protected by a downflow conduit and distributing the refrigerant values of the gas by circulating the latter through a closed conduit, equalizing temperatures within the refrigerated space by exposing a relatively small area of the gas flow in heat exchange relation with the lower part of the refrigerated space and a much greater area in lateral heat exchange relation with the higher portions of said space and causing relatively slow return of the high level warmed up part of the gas by affording increased flow section, also affording large radiating area; and varying or adjusting the normal rate of sublimation of gas by circulating atmosphere from the refrigerated space in direct heat exchange relation with the protected solid carbon dioxide.

15. The method of controlling distribution of refrigerant effects of solid carbon dioxide, which includes locating the solid carbon dioxide within and protected by a downflow conduit and distributing the refrigerant values of the gas by circulating the latter through a closed conduit, thereby making the rate of sublimination of gas from the solid dependent on the temperature of the returning gas and independent of the percentage of air in the atmosphere of the refrigerated space, equalizing temperatures within the refrigerated space by exposing a relatively small area of the gas flow in heat exchange relation with the lower part of the refrigerated space and a much greater area in lateral heat exchange relation with the higher portions of said space; and varying or adjusting the normal rate of sublimation of gas by circulating atmosphere from the refrigerated space in direct heat exchange relation with the protected solid carbon dioxide.

16. The method of controlling distribution of refrigerant effects of solid carbon dioxide, which includes locating the solid carbon dioxide within and protected by a downflow conduit and distributing the refrigerant values of the gas by circulating the latter through a closed conduit, thereby making the rate of sublimation of gas from the solid dependent on the temperature of the returning gas and independent of the percentage of air in the atmosphere of the refrigerated space, equalizing temperatures within the refrigerated space by exposing a relatively small area of the gas flow in heat exchange relation with the lower part of the refrigerated space and a much greater area in lateral heat exchange relation with the higher portions of said space and causing relatively slow return of the high level warmed up part of the gas by affording increased flow section, also affording large radiating area; and varying or adjusting the normal rate of sublimation of gas by circulating atmosphere from the refrigerated space in direct heat exchange relation with the protected solid carbon dioxide.

17. A refrigerating system including a receptacle for solid carbon dioxide, and two independent downflow conduits affording insulation for different parts of said receptacle, one being adapted to circulate the gas from said container in heat exchange relation to the refrigerated space, and the other connecting high level and low level regions of the refrigerated space and provided with valve means whereby air may be either retained therein or utilized as a thermocirculating heat transfer medium.

DAVID H. KILLEFFER.